United States Patent Office 2,784,085
Patented Mar. 5, 1957

2,784,085

MANUFACTURE OF HIGH TEMPERATURE INSULATING MATERIALS

Paul S. Denning, Joliet, Ill., assignor to F. E. Schundler & Co. Inc., Joliet, Ill., a corporation of Illinois No Drawing. Application September 3, 1948, Serial No. 47,758

8 Claims. (Cl. 92—21)

This invention relates to high temperature insulating materials and their manufacture, and among other objects, aims to provide a refractory insulation having improved properties, and which may be manufactured by a more economical process than is now available.

Another object is to provide an insulation which does not shrink during formation and which may therefore be initially molded or formed to size.

A further object is to provide an insulation of this character which is not damaged by conventional drying methods.

A still further object is to provide an inexpensive insulation which is efficient at both high and low temperatures.

Other objects and advantages and the nature of this invention may be readily understood from a description of one illustrative product and its method of manufacture.

Insulation of the character here involved is designed for use in a range of temperatures (600° F. to 1400° F.) beyond that which the conventional low temperature industrial insulation, i. e., so-called 85% magnesia, is capable of withstanding. The illustrative insulation is, however, efficient at low temperatures and is therefore in the nature of a universal insulation which may be used as both low and high temperature insulation.

Efficient high temperature insulation must be formed by molding mineral insulating aggregates together with means for binding the same into a coherent mass. Such molded insulations have heretofore shrunk (generally non-uniformly and erratically) with the result that they could not be successfully molded to exact size, but were molded over-size and then trimmed to size. This has involved not only waste, but has substantially increased the cost of manufacture.

Among other factors responsible for shrinkage is the high water content of the material as initially molded. I have discovered that the nature of the aggregate comprising the molded material is in large part responsible for the high water content. I have further discovered that such water content may be reduced, and shrinkage entirely eliminated, by the use of expanded perlite as an insulating aggregate. Perlite is an intumescing or expansible volcanic glass or obsidian containing chemically combined or dissolved water, and a small amount of fluxing substances, which cause the glass to soften at from 1600° F. to 2600° F. depending upon the type of material. When heated quickly to the softening range, the combined water puffs the ore to many times its original size to produce a material weighing as low as 1.1 pounds per cubic foot. The weight per cubic foot may be varied by the method of expansion and control of water content by pre-heating.

For convenience, the term "perlite" will be used in a generic sense to designate all such expansible glasses.

Illustrative analyses, giving the characteristic components of expanding obsidians are:

| Type of Obsidian and Locality | Percent | | | Ignition Loss | Expansion Temp., ° F. |
| --- | --- | --- | --- | --- | --- |
|  | SiO₂ | Al₂O₃ | H₂O |  |  |
| Perlite near Goodsprings, Nev | 70.63 | 13.36 | 2.84 | 2.30 | 1,949 |
| Perlite from Superior, Ariz | 73.41 | 12.34 | 3.70 | 3.70 | 1,751 |
| Obsidian near Superior, Ariz | 74.90 | 12.19 | .61 | .55 | 2,102 |
| Vitrophyre near Beatty, Nev | 72.20 | 12.49 | 1.47 | 1.20 | 2,000 |

The foregoing gives the general nature of the various expanding obsidians. It will be understood that these ores also contain varying minor amounts of CaO, Fe₂O₃, Na₂O, K₂O, etc., which partly determine the temperature at which the ore softens.

For present purposes, the expanded perlite may be regarded as an aluminum silicate. While much of it in expanded condition, is very fine, substantially none of it approaches colloidal size or nature. The expanded granules are generally sealed, hollowed bodies, the major portion of which are of generally spherical shape. I have discovered that a mass of expanded perlite of this character molded from an aqueous slurry, de-waters very quickly and holds a much smaller amount of water (which must subsequently be eliminated by heating) than other insulating aggregates heretofore used. This is important, as will presently appear, in the manufacture of molded insulation, not only as regards drying and shrinkage, but in bonding the aggregates together. In the illustrative insulation, the bond is formed by inducing a reaction between lime and the aluminum silicate of the perlite, resulting in calcium and aluminum silicates and calcium aluminates. Heretofore the reaction between lime and silica has required the use of pressure (as well as heat and moisture), but in the present material (probably because of the nature of the perlite) a reaction takes place at atmospheric pressure in the presence of heat and moisture.

The nature of the expanded perlite is largely responsible for the great utility of the material in the present invention. Regardless of the fineness to which the ore is ground or otherwise subdivided, none of the perlite after expansion approaches colloidal size, though some particles are very fine. Even when the particles of expanded perlite are as small as 5 microns, an aqueous slurry of such particles de-waters readily. The particles may even be smaller than 5 microns (though substantially larger than colloidal size) without retarding de-watering, but as a practical matter little commercially expanded perlite is smaller than 5 microns. Indeed, for practical purposes, a substantial proportion of the perlite particles are substantially larger than 5 microns, but it is the size of the smallest particles in the aggregate which determines the de-watering rate. Since the perlite expands in softened condition, the expanded particles approximate the shape of hollow spheres. No substantial portion, if any, are of such shape as to provide a multitude of capillary spaces which could hold substantial amounts of water against the forces exerted in de-watering. Thus, the absence of particles approaching colloidal size, and the generally spherical shape of the expanded particles cooperate to permit easy and substantial de-watering on molding of an aqueous slurry. As presently explained in greater detail, a five-inch thick block of expanded perlite aggregate may be de-watered in four to five minutes. Sufficient water remains to promote the reaction with lime, as next explained, but enough water has been removed to prevent substantial shrinkage. My present theory is that the efficient de-watering made possible by the character of the perlite, brings the particles into contact, and their generally spherical shape prevents further reduction in volume. The product may therefore be formed or molded to exact size, thereby eliminating oversize molding and subsequent trimming as aforesaid.

Unlike aggregates heretofore used, the moisture in the molded perlite (remaining after de-watering or molding) does not migrate rapidly to the surface or carry with it substantial amounts of the bond forming lime, but remains for a longer period on the surface of the granules of perlite, where a reaction between the dissolved lime and the perlite can take place when heated. My present theory is that owing to absence of the type of capillary spaces which have characterized aggregates heretofore used, the remaining water travels to the surface with great difficulty. This does not present a difficult drying problem because much of the water enters into combination on reaction of the lime with the perlite. Little remains to be dried out. While the molded mass contains less water than aggregates heretofore employed, the water which does remain is distributed with dissolved lime over the surfaces of the granules, where the ensuing reaction with the perlite produces an effective bond. My present theory is that aggregates heretofore employed, contained much very fine material (approaching colloidal size) and comprised particles of a shape which did not de-water readily. These held a large quantity of water and prevented it from filtering out on molding, and also were responsible for shrinkage by holding the particles in separated condition after molding. This excess water, with its dissolved lime, eventually migrated to the surface of the molded material, carrying the lime to the surface, thereby removing it from association with the aggregate on the interior of the mass, where it was needed to form a bond. Thus exposed on the surface of the material, the lime reacted with the carbon dioxide of the drying gases to form calcium carbonate, thus permanently removing the lime as a bond-forming agent.

In the illustrative material, a small amount of diatomaceous earth is advantageously added to provide a more rapidly formed supplemental bond for the aggregate. Diatomaceous earth presents large surface areas in relation to mass, and therefore provides silica in a form very favorable to efficient reaction with lime to form calcium silicates. I have found that the calcium silicate bond thus formed supplements that formed by reaction between lime and the perlite. The diatomaceous earth, though very fine in grain, is not of such character, nor is it used in amounts sufficient to interfere with rapid and efficient de-watering of the molded mass.

In the illustrative material the ratio by weight of perlite to lime in the dry ingredients for forming the product, is about 4 to 1. The perlite may vary from about 40% to 70% of the final product. The diatomaceous earth varies from about 7% to 20%. In addition, a small quantity (10 to 15%) of fibre such as long fibre asbestos is advantageously used as a reenforcement to prevent complete breaking of the molded material if it be cracked in handling or application. The fibre resists cracking and development of cracks. Often in application to irregular surfaces, a block of the material is cracked, yet the fibre prevents complete breaking of the material at the crack. The fibre also substantially improves the abrasion resistance of the product.

The ingredients comprising the illustrative insulation material are preferably dispersed in an aqueous slurry of pourable consistency and then introduced into a mold with a porous face or faces to permit de-watering. Preferably a small amount of calcium chloride is used in the slurry to accelerate the reaction between the lime and perlite, and the lime and silica (diatomaceous earth). The calcium chloride may advantageously be introduced by dissolving $CaCl_2 \cdot 6H_2O$ in water to provide a solution of 3° Bé. concentration. This solution is used in place of plain water to form the slurry. A small amount of calcium chloride remains in the product, but most of it passes out on de-watering. The recovered solution may then be used again.

The materials may advantageously be compressed to accelerate de-watering and partly to consolidate the aggregates during de-watering to bring them into effective bonding contact for development of the bond. Pressures of about 65 pounds per square inch may be used. A block five inches thick of the illustrative insulating material requires only 4 to 5 minutes to de-water. So much water is thus eliminated that the wet material then weighs only about 2½ times the dry weight of the completed insulation.

After de-watering the molded material is introduced into a heated atmosphere, preferably not exceeding 600° F. Indeed, when asbestos fibre is used, the temperature should preferably not substantially exceed 500° F., otherwise the asbestos fibre becomes brittle and weaker. Lower temperatures require more time for development of a bond, but are otherwise satisfactory. The heating atmosphere may advantageously comprise hot products of combustion containing carbon dioxide, since direct heating is more economical. For reasons above stated, the $CO_2$ in the hot gases is unable to inactivate a substantial amount of the lime by forming calcium carbonate. During the heating process, the lime reacts with the perlite and diatomaceous earth in the presence of the residual water, which is amply sufficient for this purpose. Because of the nature of the perlite, the water does not migrate to the surface so rapidly during the heating period as materials heretofore made and bonded with lime and silica. The water therefore is present inside of the material for a period long enough for the necessary reaction. After the reaction, continued heating evaporates uncombined water.

One illustrative material comprises:

|  | Percent |
|---|---|
| Perlite—minus 20 mesh (weighing 3.15 pounds per cubic foot | 60 |
| $Ca(OH)_2$ | 15 |
| Long fibre asbestos | 15 |
| Diatomaceous earth (white) | 10 |
|  | 100 |

Material coarser than 20 mesh may be used, but with a decrease in insulating efficiency. The larger the pores (coarse aggregate is characterized by large pores) the lower the insulating efficiency.

The product may advantageously be made by the following process, though it will be understood that the sequence of steps in fabrication, and particularly forming the slurry containing the aggregates, may be considerably varied.

The aqueous solution in which the solid constituents are dispersed is preferably a 3° Bé. solution of calcium chloride. About thirty gallons (containing about 14.09 pounds of $CaCl_2.6H_2O$) are employed for each 25 pounds of dry ingredients. The use of calcium chloride is not essential, but it advantageously accelerates the reaction between the perlite and diatomaceous earth and the lime. Little remains, as such, in the final product. The concentration of the solution may, of course, vary, and the amount of liquid used may also be varied to provide a slurry of the desired consistency. Preferably, dilution should not exceed what is necessary to produce a slurry of pourable consistency.

In the illustrative process the lime and diatomaceous earth are advantageously dispersed in approximately one-third of the total calcium chloride solution required, until a uniform consistency is obtained. This requires about five minutes of mechanical agitation. To this slurry the perlite and an additional one-third of the calcium chloride solution is added, and agitated to obtain a thorough dispersal. Preferably the agitation should be gentle so as not to break down the granules of perlite.

The fibre is separately dispersed in the remaining one-third calcium chloride solution and when dispersed, the lime, perlite and diatomaceous earth slurry is added thereto. The latter slurry may be pumped into the fibre slurry, or as in this case, transmitted by about 30 pounds per square inch air pressure. Dispersion and thorough mixing of the two slurries is facilitated if the perlite etc. slurry is blown into the bottom of the tank containing the fibre slurry. If added from above the buoyancy of the perlite makes thorough mixing more difficult. This dispersion is effected by air agitation by means of the air pressure used to transfer the slurry as aforesaid. While the foregoing sequence of mixing and dispersion steps produces good results, the sequence may be considerably varied.

As soon as mixing and dispersion is complete, the slurry may be delivered to the molds, preferably hydraulic pressure molds, into which the slurry is introduced with air pressure. About 65 pounds per square inch pressure is used in the presses to dispel the water and lightly consolidate the solids. Filtering or de-watering time for a five-inch thick block is from 4 to 5 minutes, much less time than has heretofore been required for other high temperature insulations. The calcium chloride solution is recovered and used again. After thus de-watering, the wet block weighs about 2½ times its dry weight. In this condition the molded blocks are introduced into a heating atmosphere of about 500° F. to produce the aforesaid reaction and then to drive off uncombined water.

Drying is continued for about 60 hours, although this time may be reduced, since very little water is removed in the final 12 hours of drying. For example, a five-inch thick block, 19½" x 38" face, weighs 97½ pounds, after 4 minutes of de-watering. After 24 hours drying it weighs 41 pounds, after 48 hours, 33 pounds, and after 60 hours, 29 pounds. De-watering removes about 190 pounds solution, leaving only about 68 pounds of water, of which only that not combined in the aforesaid reaction need be removed by drying. It is the relatively small amount of residual water which (although adequate for reaction) retards migration of lime to the surface. The nature of the perlite, i. e., the general spherical shape of the particles and absence of the very fine particles, substantially contributes to retarding migration of lime to the surface.

The illustrative insulation weighs 13½ pounds per cubic foot and has a modulus of rupture of 42.4 pounds per square inch. There is substantially no shrinkage during drying, and even under a soaking heat of 1500° F. for six hours, the shrinkage is only 1.68%. The K factor is .389 at 100° F. mean temperature, and .415 at 300° F. mean temperature. The K factor for the loose perlite used in the product is .275 at 100° F. mean temperature, and .325 at 300° mean temperature. Such perlite weighs 3.15 pounds per cubic foot.

Obviously the invention is not limited to the details of the illustrative product and its method of manufacture, since these may be variously modified. Moreover, it is not indispensable that all features of the invention be used conjointly, since various features may be used to advantage in different combinations.

Having described my invention, I claim:

1. The method of making bonded thermal insulation which comprises forming in a 3 deg. Baume water solution of calcium chloride a slurry of pourable consistency containing minor amounts of lime and diatomaceous earth and a major amount of granules of expanded perlite of generally spherical shape and characterized by absence of continuous capillary spaces in a mass of granules, no substantial amount of said granules being smaller than 5 microns in size, whereby when molded the interstices between the granules permit ready de-watering and retain insufficient water to cause shrinkage on drying, forming and removing the water except a small amount adhering to the surfaces of the granules, and then subjecting the formed material to heat not substantially exceeding 600 deg. F. to induce reaction between the lime, perlite and diatomaceous earth in the presence of the water adhering to the granules to form bonding substances to bond said granules together; the water remaining in the mass after forming being unable to migrate readily to the surface through said interstices, whereby it remains distributed throughout the mass for said reaction, and then continuing heating to drive off uncombined water.

2. The method of making bonded thermal insulation which comprises forming an aqueous slurry of pourable consistency containing 15% to 22% lime, 7% to 20% diatomaceous earth, 10% to 15% fibre, and 40% to 70% granules of expanded perlite of generally spherical shape and characterized by absence of continuous capillary spaces between the granules by which water might migrate to the exterior of a mass of granules, no substantial amount of said granules being smaller than 5 microns in size, whereby when molded the interstices between the granules permit ready de-watering but retain some water adhering to the granules which water is insufficient to cause shrinkage on drying, forming and de-watering the mass and then subjecting the formed material to heat not substantially exceeding 600 deg. F. to induce reaction between the lime, perlite and diatomaceous earth in the presence of the remaining water to form bonding substances to bond said granules together; the water remaining in the mass after forming being unable to migrate readily to the surface because of absence of continuous capillary spaces, whereby it remains distributed throughout the mass for said reaction, and then continuing heating to drive off uncombined water.

3. The method of making bonded thermal insulation which comprises forming an aqueous slurry of pourable consistency containing about 15% lime, 10% diatomaceous earth, and 60% granules of expanded perlite of generally spherical shape and characterized by absence of continuous capillary spaces between the granules, no substantial amount of said granules being smaller than 5 microns in size, whereby when molded the interstices between the granules permit ready de-watering and retain insufficient water to cause shrinkage on drying, forming and de-watering the mass, a small amount of water adhering to the surfaces of the granules, and then subjecting the formed material to heat not substantially exceeding 600 deg. F. to induce reaction between the lime, perlite and diatomaceous earth in the presence of the remaining water to form bonding substances to bond said granules together; the water remaining in the mass after forming and de-watering being unable to migrate readily to the surface through said interstices, whereby it remains distributed throughout the mass for said reaction, and then continuing heating to drive off uncombined water.

4. The method of making bonded thermal insulation which comprises forming an aqueous slurry of pourable consistency containing minor amounts of lime and diatomaceous earth and a major amount of granules of expanded perlite of generally spherical shape, no substantial amount of said granules being smaller than 5 microns in size whereby the mass de-waters readily on forming, forming and de-watering the mass until the granules are in substantial contact, thereby preventing subsequent shrinkage, the amount of lime and diatomaceous earth being insufficient to interfere substantially with ready de-watering of the mass, heating the formed mass after de-watering in an atmosphere of hot gases of combustion not substantially exceeding 600 deg. F., the water remaining in the mass after forming and de-watering being insufficient to migrate readily to the surface through the interstices between the granules, whereby it remains distributed throughout the mass to combine with said lime, diatomaceous earth and perlite to form bonding substances to bond said granules together, and then continuing heating to drive off uncombined water.

5. The method of making bonded high temperature thermal insulation which comprises forming an aqueous slurry of pourable consistency containing minor amounts of lime and diatomaceous earth and a major amount of granules of expanded perlite of generally spherical shape which provides substantial communicating pores between the granules through which water may freely pass, no substantial amount of said granules being smaller than 5 microns in size, whereby when molded the interstices between the granules permit ready de-watering and retain insufficient water to cause shrinkage on drying, forming and de-watering the mass and then subjecting the formed material to heat not substantially exceeding 600 deg. F. to induce reaction between the lime, perlite and diatomaceous earth in the presence of the remaining water to form bonding substances to bond said granules together; the water remaining in the mass after forming being insufficient to migrate readily to the surface through said interstices, whereby it remains distributed throughout the mass for said reaction, and then continuing heating to drive off uncombined water.

6. The method of reducing shrinkage on drying of a molded high temperature insulation which comprises dispersing in an aqueous solution of calcium chloride of about 3 deg. Baume concentration granules of expanded perlite none of which are substantially smaller than five microns in size and which are generally spherical shape to provide substantial communicating pores between the granules through which water may freely pass, incorporating lime and a minor amount of silica in the form of diatomaceous earth and a minor amount of fibre in said slurry, then introducing the slurry into a mold and de-watering the same until the weight of the de-watered product is only about 2½ times its eventual weight when dry, then introducing the de-watered product into an atmosphere comprising gaseous product of combustion not exceeding 600 deg. F. in temperature to produce reaction between the lime, perlite and diatomaceous earth to bond the granules of perlite into a coherent mass, the residual water in the mass being insufficient to carry a substantial amount of lime to the surface of the molded mass, continuing such heating after substantial completion of said reaction, to remove most of the remaining water.

7. The method of reducing shrinkage on drying of a molded high temperature insulation which comprises dispersing in a pourable aqueous slurry granules of expanded perlite of a size not substantially exceeding 20 mesh and not substantially smaller than five microns and being of generally spherical shape so as to provide substantial communicating pore spaces through which water may freely pass, thereby providing a mass of aggregate which readily de-waters, incorporating lime and a minor amount of silica in the form of diatomaceous earth in said slurry, then introducing the slurry into a mold and de-watering the same until the weight of the de-watered product is only about 2½ times its eventual weight when dry, then introducing the de-watered product into an atmosphere comprising gaseous product of combustion not exceeding 600 deg. F. in temperature to produce reaction between the lime, perlite and diatomaceous earth to bond the granules of perlite into a coherent mass, the residual water in the mass being insufficient to carry a substantial amount of lime to the surface of the molded mass, continuing such heating after substantial completion of said reaction, to remove most of the remaining water.

8. The method of making a high temperature mineral insulation which does not shrink on drying, which comprises dispersing granules of expanded perlite, lime and a minor amount of diatomaceous earth, in an aqueous slurry of pourable consistency, the particles of perlite being of generally spherical shape so as to contact with each other in only limited areas thereby providing substantial communicating pore spaces between granules through which water may freely pass, said perlite containing substantially no particles smaller than 5 microns, introducing said slurry into a mold and removing a substantial part of the water in said pore spaces, continuing removal of the water from the molded material for about 5 minutes until it weighs only about 2½ times its weight when dry, then introducing the molded products into a heating atmosphere not substantially exceeding 600 deg. F. to facilitate reaction between the lime, diatomaceous earth and the perlite, and following such reaction continuing the exposure to heat until the product is substantially dry.

References Cited in the file of this patent

UNITED STATES PATENTS

| Number | Name | Date |
|---|---|---|
| 1,968,489 | Jenkins | July 31, 1934 |
| 2,175,715 | Denning | Oct. 10, 1939 |
| 2,247,355 | Brown | July 1, 1941 |
| 2,266,636 | Hauser | Dec. 16, 1941 |
| 2,266,637 | Hauser | Dec. 16, 1941 |
| 2,300,137 | Salisbury | Oct. 27, 1942 |
| 2,388,060 | Hicks | Oct. 30, 1945 |
| 2,462,255 | Charman et al. | Feb. 22, 1949 |
| 2,462,538 | Nagel | Feb. 22, 1949 |
| 2,487,207 | Adams | Nov. 8, 1949 |
| 2,501,698 | Stecker | Mar. 28, 1950 |
| 2,501,699 | Stecker | Mar. 28, 1950 |
| 2,542,721 | Stafford | Feb. 20, 1951 |
| 2,554,934 | Ayers | May 29, 1951 |
| 2,580,076 | Deane | Dec. 25, 1951 |
| 2,585,366 | Bollaert et al. | Feb. 12, 1952 |

OTHER REFERENCES

University of Arizona Bulletin, vol. 15, No. 4, pp. 34 and 35, October 1944.